United States Patent
Huang et al.

(10) Patent No.: US 9,601,751 B2
(45) Date of Patent: Mar. 21, 2017

(54) ANNEALING METHOD FOR THIN FILM ELECTRODES

(71) Applicant: Apple Inc., Cupertino, CA (US)

(72) Inventors: Lili Huang, San Jose, CA (US); Richard M. Mank, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/040,597

(22) Filed: Sep. 27, 2013

(65) Prior Publication Data

US 2014/0272190 A1 Sep. 18, 2014

Related U.S. Application Data

(60) Provisional application No. 61/799,226, filed on Mar. 15, 2013.

(51) Int. Cl.
| | |
|---|---|
| *B05D 3/00* | (2006.01) |
| *H01M 4/131* | (2010.01) |
| *H01M 4/139* | (2010.01) |
| *H01M 4/1391* | (2010.01) |
| *H01M 4/04* | (2006.01) |
| *H01M 4/02* | (2006.01) |

(52) U.S. Cl.
CPC ......... *H01M 4/131* (2013.01); *H01M 4/0471* (2013.01); *H01M 4/139* (2013.01); *H01M 4/1391* (2013.01); *H01M 4/0423* (2013.01); *H01M 2004/021* (2013.01); *Y02E 60/122* (2013.01); *Y02P 70/54* (2015.11)

(58) Field of Classification Search
CPC .................................. H01M 4/131; B05D 3/06
See application file for complete search history.

(56) References Cited

U.S. PATENT DOCUMENTS

| | | |
|---|---|---|
| 3,655,455 A | 4/1972 | Jones |
| 4,369,225 A | 1/1983 | Manabe et al. |
| 5,134,046 A | 7/1992 | Chow et al. |
| 5,523,179 A | 6/1996 | Chu |

(Continued)

FOREIGN PATENT DOCUMENTS

| | | |
|---|---|---|
| CN | 1144017 | 2/1997 |
| CN | 101640968 | 2/2010 |

(Continued)

OTHER PUBLICATIONS

Zhonghua et al., "Layered Cathode Materials Li [$Ni_xLi_{(1/3-2x/3)}Mn_{(2/3-x/d)}$]$O_2$ for Lithium-Ion Batteries," *Electrochemical and Solid-State Letters*, vol. 4, No. 11, 2001, pp. A191-A194.

*Primary Examiner* — Dah-Wei D Yuan
*Assistant Examiner* — Nga Leung V Law
(74) *Attorney, Agent, or Firm* — Brownstein Hyatt Farber Schreck, LLP (57) ABSTRACT

A method of annealing a thin film deposited on a substrate. According to the method, the thin film deposited on the substrate is provided. The provided thin film is irradiated with electromagnetic radiation until a predetermined crystal quality of the thin film is achieved. The spectral band of the electromagnetic radiation is selected such that the thin film is substantially absorptive to the electromagnetic radiation and the substrate is substantially transparent to the electromagnetic radiation.

21 Claims, 6 Drawing Sheets

(56) References Cited

U.S. PATENT DOCUMENTS

| | | |
|---|---|---|
| 5,554,459 A | 9/1996 | Gozdz et al. |
| 5,561,004 A | 10/1996 | Bates et al. |
| 6,001,138 A | 12/1999 | Dix |
| 6,200,634 B1 * | 3/2001 | Johnsgard ............ C23C 16/481 |
| | | 118/666 |
| 6,319,631 B1 | 11/2001 | Bay et al. |
| 6,410,189 B1 | 6/2002 | Yamada et al. |
| 6,610,572 B1 * | 8/2003 | Takei et al. ................... 438/268 |
| 6,713,987 B2 | 3/2004 | Krasnov et al. |
| 7,585,582 B2 | 9/2009 | Chen |
| 7,801,613 B2 | 9/2010 | Li et al. |
| 7,927,744 B2 | 4/2011 | Mizutani et al. |
| 7,931,989 B2 | 4/2011 | Klaassen |
| 7,935,439 B2 | 5/2011 | Kim |
| 7,939,195 B2 | 5/2011 | Salot et al. |
| 7,959,769 B2 | 6/2011 | Zhang et al. |
| 7,960,054 B2 | 6/2011 | Zhang et al. |
| 8,044,813 B1 | 10/2011 | Dembo |
| 8,153,301 B2 | 4/2012 | Jiang |
| 8,168,322 B2 | 5/2012 | Krasnov et al. |
| 8,431,264 B2 | 4/2013 | Neudecker et al. |
| 8,435,312 B2 | 5/2013 | Chen |
| 8,445,130 B2 | 5/2013 | Neudecker et al. |
| 8,518,583 B2 | 8/2013 | Mizuno et al. |
| 8,669,345 B2 | 3/2014 | Lee et al. |
| 8,679,674 B2 | 3/2014 | Liang et al. |
| 8,822,059 B2 | 9/2014 | Wang |
| 8,956,761 B2 | 2/2015 | Reynolds et al. |
| 9,209,451 B2 | 12/2015 | Fukushima |
| 2001/0032666 A1 | 10/2001 | Jenson et al. |
| 2005/0079418 A1 | 4/2005 | Kelley et al. |
| 2005/0153078 A1 | 7/2005 | Bentley et al. |
| 2005/0250010 A1 | 11/2005 | Kurihara et al. |
| 2006/0210880 A1 | 9/2006 | Howard et al. |
| 2008/0032236 A1 | 2/2008 | Wallace |
| 2009/0181303 A1 | 7/2009 | Neudecker et al. |
| 2009/0193649 A1 | 8/2009 | Niessen et al. |
| 2009/0208754 A1 | 8/2009 | Chu et al. |
| 2009/0214899 A1 | 8/2009 | Shakespeare et al. |
| 2009/0317708 A1 | 12/2009 | Brandl et al. |
| 2010/0035152 A1 | 2/2010 | Sastry et al. |
| 2010/0066683 A1 | 3/2010 | Chang et al. |
| 2011/0123844 A1 | 5/2011 | Bhardwaj et al. |
| 2011/0129594 A1 | 6/2011 | Kwak et al. |
| 2011/0177398 A1 | 7/2011 | Affinito et al. |
| 2011/0183183 A1 | 7/2011 | Grady et al. |
| 2011/0195271 A1 | 8/2011 | Zadesky et al. |
| 2011/0200868 A1 | 8/2011 | Klaassen |
| 2011/0294015 A1 | 12/2011 | Pirk et al. |
| 2012/0078317 A1 | 3/2012 | Wang et al. |
| 2012/0251867 A1 | 10/2012 | Krasnov et al. |
| 2013/0029205 A1 | 1/2013 | Adams |
| 2013/0176654 A1 | 7/2013 | Wang et al. |
| 2013/0344363 A1 * | 12/2013 | Upadhyaya ..................... 429/94 |
| 2014/0007418 A1 * | 1/2014 | Song ..................... H01M 6/005 |
| | | 29/623.1 |
| 2014/0011067 A1 * | 1/2014 | Baba et al. ................... 429/124 |
| 2014/0147731 A1 | 5/2014 | Anastas et al. |
| 2014/0147737 A1 | 5/2014 | Anastas et al. |
| 2014/0147742 A1 | 5/2014 | Anastas et al. |
| 2014/0264915 A1 | 9/2014 | Huang et al. |
| 2014/0265915 A1 | 9/2014 | Huang et al. |
| 2014/0272541 A1 | 9/2014 | Huang et al. |
| 2014/0272560 A1 | 9/2014 | Huang et al. |
| 2014/0272561 A1 | 9/2014 | Huang et al. |
| 2014/0273890 A1 | 9/2014 | Huang et al. |
| 2015/0325862 A1 | 11/2015 | Song et al. |
| 2016/0064719 A1 | 3/2016 | Bushnell et al. |
| 2016/0093837 A1 | 3/2016 | Bushnell et al. |

FOREIGN PATENT DOCUMENTS

| | | |
|---|---|---|
| CN | 101676845 | 3/2010 |
| EP | 0792741 | 9/1997 |
| EP | 0975031 | 1/2000 |
| EP | 1804315 | 7/2007 |
| EP | 2105983 | 9/2009 |
| EP | 2481499 | 8/2012 |
| JP | 61032951 | 2/1986 |
| JP | 63314770 | 12/1988 |
| JP | 2013004173 | 1/2013 |
| JP | 2013021347 | 1/2013 |
| TW | I306319 | 2/2009 |
| TW | 201010094 | 3/2010 |
| TW | 201014020 | 4/2010 |
| TW | 201108441 | 3/2011 |
| TW | 201218494 | 5/2012 |
| WO | WO 2008/007867 | 1/2008 |
| WO | WO 2010/033609 | 3/2010 |
| WO | WO 2012/086557 | 6/2012 |
| WO | WO 2012090929 A1 * | 7/2012 |
| WO | WO 2012/114162 | 8/2012 |

\* cited by examiner

ANNEALING METHOD FOR THIN FILM ELECTRODES

This application claims the benefit under 35 U.S.C. §1.119(e) of U.S. Provisional Patent Application No. 61/799,226, filed Mar. 15, 2013, entitled "Annealing Method for Thin Film Electrodes," the entirety of which is incorporated herein by reference as if fully recited herein.

TECHNICAL FIELD

The present invention relates to methods of annealing thin film electrodes deposited on thermally sensitive substrates generally and methods for annealing thin film battery cathodes particularly

BACKGROUND

Many electronic devices, such as laptops, tablet computers, smartphones, and the like, use rechargeable batteries to provide power to one or more electronic components. A number of electronic devices use thin film batteries as the power source because of the many advantages it has over other batteries. For example, lithium ion thin film batteries which have a potential high energy density while maintaining a relatively compact configuration.

A lithium thin film battery's performance is significantly affected by properties of the cathode electrode. Currently, a number of lithium ion thin film batteries use a lithium cobalt oxide ($LiCoO_2$) cathode that has a thickness of 10 micron or thinner. These batteries have a capacity of about 2 mAh or less. One approach to increase battery capacity, and thus increase the number of applications the battery can be used for, is to increase the thickness of the $LiCoO_2$ film. Another is to increase the quality of the cathode material. In both of these approaches, it may be useful to anneal the thin film cathode material.

In a typical annealing process, after the $LiCoO_2$ film has been deposited on a substrate, the substrate is loaded into a furnace at a temperature as high as 700 C for a few hours. This thermal annealing process is useful to change the crystalline structure and improve the crystal quality of the $LiCoO_2$ film. Unfortunately, current annealing processes have several disadvantages, including: the high temperature used significantly limits possible substrate selections, as the substrate material has to be able to stably withstand at the anneal temperature; practically mass production may be difficult; increased production costs related to the use of a high temperature annealing process. Example embodiments include annealing processes that allow the improvement of the crystal quality of $LiCoO_2$ cathode material in thin film batteries, as well as other thin film materials, without subjecting the substrate on which the film is deposited having to withstand the high temperature conditions typically associated with annealing processes.

SUMMARY

One sample embodiment, as described herein, is a method of annealing a thin film deposited on a substrate. According to the method, the thin film deposited on the substrate is provided. The provided thin film is irradiated with electromagnetic radiation until a predetermined crystal quality of the thin film is achieved. The spectral band of the electromagnetic radiation is selected such that the thin film is substantially absorptive to the electromagnetic radiation and the substrate is substantially transparent to the electromagnetic radiation.

Another example embodiment, as described herein, is a method of annealing a thin film deposited on a substrate. According to the method, the thin film deposited on the substrate is provided. The thin film has a film electrical conductivity that is greater than the substrate electrical conductivity of the substrate. An electrical current is passed through the thin film to heat the thin film to an annealing temperature.

A further example embodiment, as described herein, is a method of annealing a cathode of a thin film battery. According to the method, the thin film battery is provided. The thin film battery includes: a substrate; the cathode deposited on the substrate; an electrolyte layer formed on the cathode; and an anode formed on the electrolyte layer. The cathode is heated to an annealing temperature. And the temperature increase of the substrate, the electrolyte layer, and the anode are limited during annealing of the cathode.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present disclosure, it is believed that the embodiments are best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

DETAILED DESCRIPTION

Production of thicker films may pose various difficulties that may reduce the quality of the cathode material. For example, thicker films may result in film cracking and undesirable crystal structures due to the high deposition rate often used to form thick films. Film cracking and/or undesirable crystal structure may cause low utilization and lithium diffusion rates, which may result in poor battery performance. Such issues may significantly limit the film thickness in lithium thin film batteries.

These issues may be particularly prevalent when physical vapor deposition (PVD) methods are used, such as: cathodic arc deposition; electron beam physical vapor deposition; evaporative deposition; pulsed laser deposition; and sputter deposition. Lithium cobalt oxide ($LiCoO_2$) having a (104) crystal orientation may be useful to produce an improved cathode of a Li ion thin film battery, as such a cathode may allow for increased Li ion utilization in the thin film battery. However, PVD deposited $LiCoO_2$ may typically result in a film made up of amorphous or polycrystalline structures, which may include (003), (102), (101) and/or (104) crystal orientations. One approach to achieve the (104) oriented structure from PVD-grown $LiCoO_2$ is to anneal the deposited film. In a typical annealing process, once the $LiCoO_2$ film has been deposited on a substrate, the substrate is loaded into a furnace at a temperature as high as 700 C for a few hours. This thermal annealing process is useful to change the crystalline structure of the $LiCoO_2$ film to be substantially aligned in the (104) crystal orientation.

As noted above, current annealing processes have several disadvantages, including: the high temperature used significantly limits possible substrate selections, as the substrate material has to be able to stably withstand at the anneal temperature; practically mass production may be difficult; increased production costs related to the use of a high temperature annealing process. Example embodiments described herein include annealing processes that may transform the crystalline structure and improve the crystal quality of $LiCoO_2$ cathode material in thin film batteries, as well as other thin film materials, without subjecting the substrate on which the film is deposited having to withstand the high temperature conditions typically associated with annealing processes. These example processes may also allow for improved mass production capabilities and reduced production costs, as compared to typical furnace annealing processes.

Figure 1:
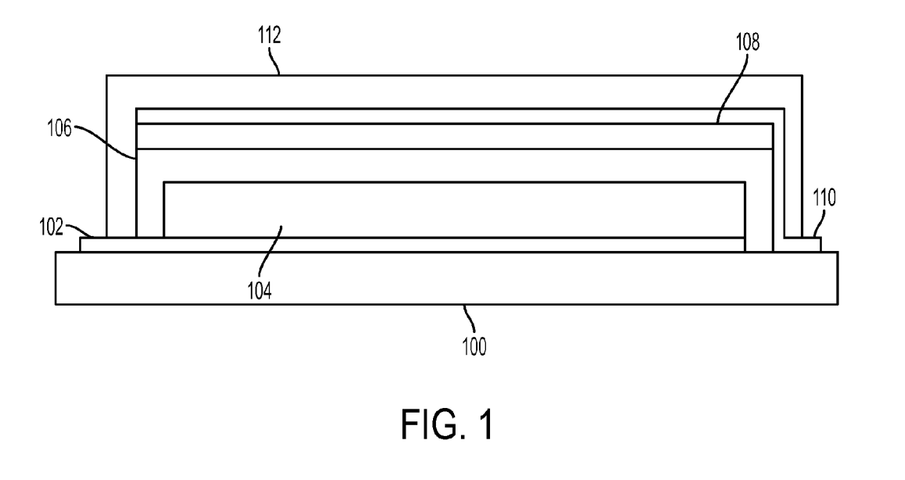
FIG. 1 is a side plan drawing of an example thin film battery.

FIG. 1 illustrates an example thin film battery. This example battery includes: substrate 100; cathode current collector 102; cathode 104; electrolyte 106; anode 108; anode current collector 110; and encapsulation layer 112. This example thin film battery structure was selected for illustrative purposes and is not intended as limiting. One skilled in the art may understand that the example method described herein may be used in the production of other thin film battery structures and/or other devices that include thin films in which annealing of the thin films may be useful.

In the example thin film battery of FIG. 1, cathode current collector 102 and cathode 104 are deposited on substrate 100, often using a PVD method, such as sputtering deposition. In this example, cathode 104 is formed of $LiCoO_2$ and cathode current collector 102 is selected to be a material that is both relatively chemically inert with $LiCoO_2$ and highly electrically conductive, for example aluminum, copper, or gold.

Electrolyte 106, anode 108, and anode current collector 110 are assembled on substrate 100 with deposited cathode current collector 102 and cathode 104, and encapsulation layer 112 is useful to seal the battery, as well as holding the anode structure in place. Electrolyte 106 may be an organic solvent, such as ethylene or a methyl ethyl carbonate. Anode 108 is typically includes a carbon structure and anode current collector 110 is selected to be a material that is both relatively chemically inert with anode material and highly electrically conductive, possibly the same material as cathode current collector 102. Encapsulation layer 112 often includes a polymer and may include a ceramic layer or metal case.

Figure 2:
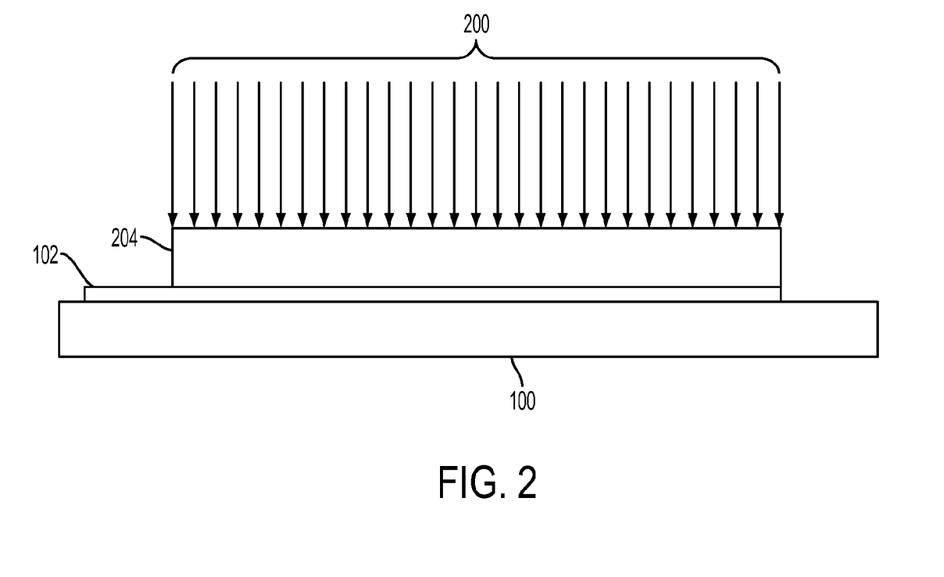
FIG. 2 is a side plan drawing of an example thin film battery cathode undergoing electromagnetic radiation according to an embodiment.

FIG. 2 graphically illustrates an example thin film cathode undergoing the example annealing method of FIG. 2. In this example embodiment, unannealed thin film cathode 204, which has been deposited (along with cathode current collector 102) on substrate 100, is shown being irradiated with electromagnetic radiation 200. It is noted that in FIG. 2 electromagnetic radiation 200 is shown as propagating downward to irradiate unannealed thin film cathode 204 from above. One skilled in the art may understand that this figure is merely illustrative and is not intended as limiting. It is contemplated that electromagnetic radiation 200 may irradiate unannealed thin film cathode 204 from any direction.

Figure 3:
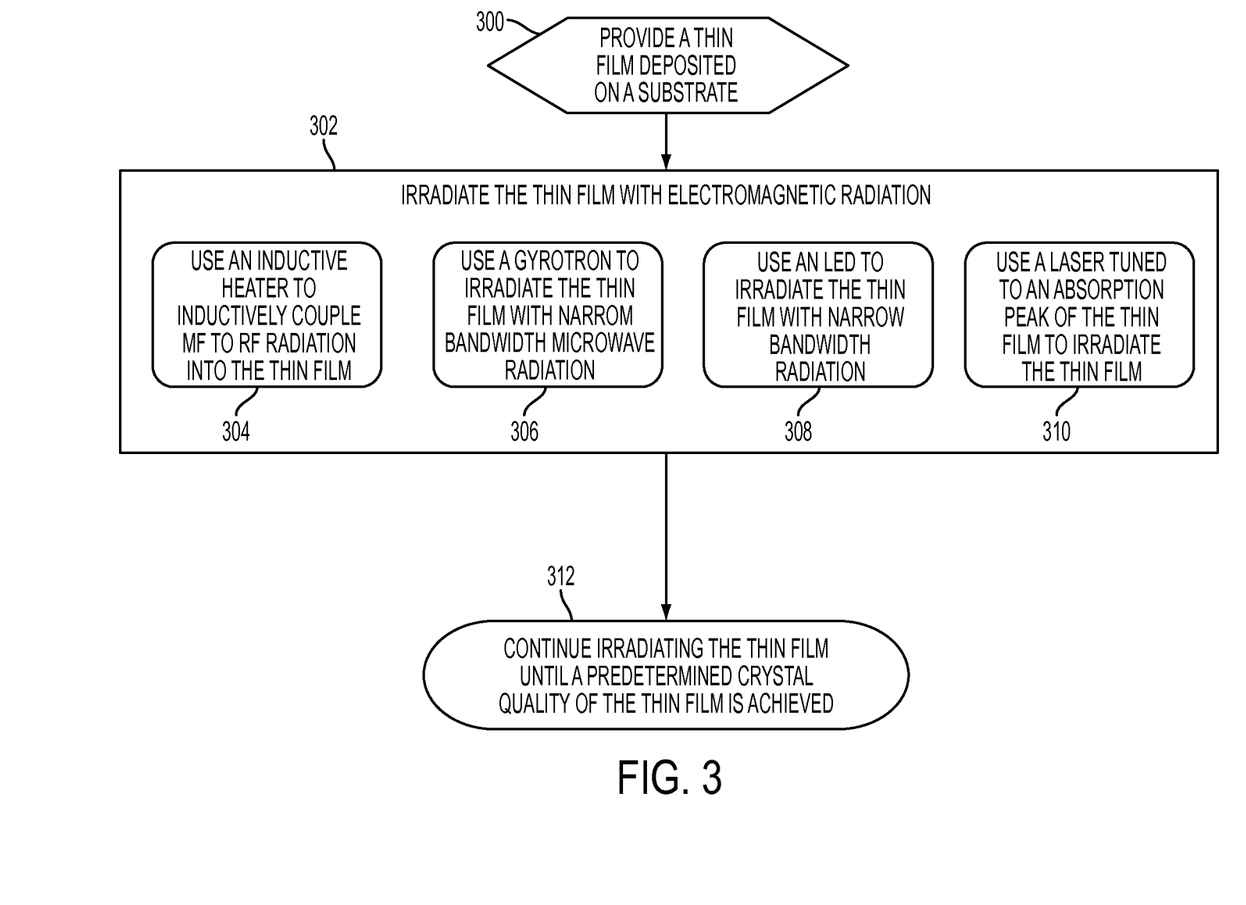
FIG. 3 is flowchart of an example thin film annealing method according to an embodiment.

FIG. 3 is a flowchart outlining an example method of annealing a thin film deposited on a substrate. The method begins with step 300, providing the unannealed thin film that has been deposited on the substrate. As described above, the thin film may typically be deposited using a PVD process; however, it is noted that the example methods described herein, including the example method of FIG. 3, may be used on thin film materials deposited using other processes. Additionally, it is noted that although, example embodiment of FIG. 2 illustrates the unannealed thin film to be annealed as thin film cathode material 204 (which may include at least one of: amorphous $LiCoO_2$; or polycrystalline $LiCoO_2$), the example method of FIG. 3 may be used to anneal other thin film materials.

The thin film is irradiated with electromagnetic radiation, step 302. The spectral band of this electromagnetic radiation is selected such that energy from the electromagnetic radiation is readily absorbed by the thin film and not by the substrate. It may be useful for the substrate to be substantially transparent to the electromagnetic radiation, particularly is the electromagnetic radiation may irradiate the thin film through the substrate. As noted above, in the example embodiment illustrated in FIG. 2, electromagnetic radiation 200 irradiates unannealed thin film cathode 204 from above without passing through substrate 100; however, it may be useful for the thin film to be irradiated from more than one direction. For example, in one embodiment, the substrate and deposited thin film may be placed in a reflective chamber so that any electromagnetic radiation that is transmitted though the thin film without being absorbed may be reflected back into the thin film, thus improving the efficiency of the example annealing process.

This electromagnetic irradiation may be continued until a predetermined crystal quality of the thin film is achieved, step 312, and the annealing process is complete. One example approach is to continue the irradiation for a predetermined period of time. In the example embodiment of FIG. 2, this may involve transforming thin film cathode material 204 into a cathode formed of a substantially crystalline $LiCoO_2$ layer having a (104) oriented crystal structure.

Because the electromagnetic energy is being absorbed directly into the thin film, and is not substantially absorbed by the substrate, the example method of FIG. 3 may allow the thin film to be annealed without significantly heating the substrate. At a minimum a majority of the substrate may remain at a lower temperature than the furnace temperature that would be used in a typical annealing process. This reduced heating of the substrate in the example method of FIG. 3 may allow for the use various substrate materials that could not survive a typical annealing process. Further, the example method of FIG. 3 may be significantly more energy and equipment efficient, which may reduce production costs and streamline mass production of components (such as thin film batteries) incorporating the resulting annealed thin films.

FIG. 3 also illustrates four example approaches to irradiating the thin film with electromagnetic radiation in step 302 of this example method. It is noted that these four approaches and intended merely as examples, and do not represent an exhaustive list of the ways in which step 302 may be performed.

One of these example approaches is to use an inductive heater to inductively couple medium frequency (MF) to radio-frequency (RF) radiation into the thin film, alternative substep 304. MF radiation is traditionally used to describe electromagnetic radiation in the frequency range from 1 to 10 kHz, while RF radiation is traditionally used to describe electromagnetic radiation in the frequency range from 100 kHz up to 10 MHz. Inductive heaters operate by irradiating a target object with MF or RF radiation to generate eddy currents within a conductive target object via induction. These eddy currents then heat the target object through joule heating. If the thin film has a significantly higher conductivity than the substrate (low conductivity material being essentially transparent to these wavelengths), then inductive heating may selectively heat the thin film to the annealing temperature, or above, with minimal direct heating of the substrate. Although the temperature of the substrate may rise due to heat conduction from the thin film, the lack of direct heating from the electromagnetic radiation allows the substrate to remain at a significantly lower temperature (i.e. lower than a substrate damage temperature) throughout the annealing process. Heating of the substrate may be lowered further by thermally coupling the substrate to a heatsink. The example embodiment of FIG. 5 includes heatsink 502 coupled to substrate 100 to illustrate this alternative feature.

Two additional example approaches to irradiating the thin film are to use a gyrotron, alternative substep 306, or to use an LED, alternative substep 308, to irradiate the thin film with narrow bandwidth radiation. Gyrotrons may generate relatively narrow bandwidth microwave radiation, while LEDs are capable of generating narrow bandwidth radiation at frequencies ranging from the infrared (IR), through the visible, and even into the ultraviolet (UV) spectrum. Both gyrotrons and LEDs can be designed to supply electromagnetic radiation in a predetermine bandwidth. Proper selection of their spectral bands may allow for selective absorption of the electromagnetic radiation by the thin film and not by the substrate. The absorbed electromagnetic energy in these alternative substeps may manifest as heat within the thin film to increases its temperature to the annealing temperature, or above, as in alternative substep 304, described above.

Alternatively, the spectral band of the electromagnetic radiation may be selected such that the thin film is annealed by absorbing the electromagnetic radiation through a nonthermal process, i.e. the electromagnetic energy is absorbed directly into quantum states that result in realignment of the crystal structure of the thin film. This alternative approach may allow the thin film to be annealed without heating either the substrate, or the thin film.

The final of the four example approaches to irradiating the thin film illustrated in FIG. 3 is to use a laser tuned to an absorption peak of the thin film, alternative substep 310. This approach may allow for the most efficient targeting of energy into the thin film. The absorption peak to which the laser is tuned may cause heating of the thin film or may lead to direct realignment of the crystal structure of the thin film.

It is noted that if the spectral band of the electromagnetic radiation is tuned to such that the electromagnetic energy is absorbed directly into quantum states that result in realignment of the crystal structure of the thin film, it may be possible to determine when the predetermined crystal quality of the thin film has been achieved in step 312 by measuring the amount of electromagnetic radiation transmitted through the thin film and ceasing irradiation once a predetermined transmission coefficient is achieved.

Figure 4:
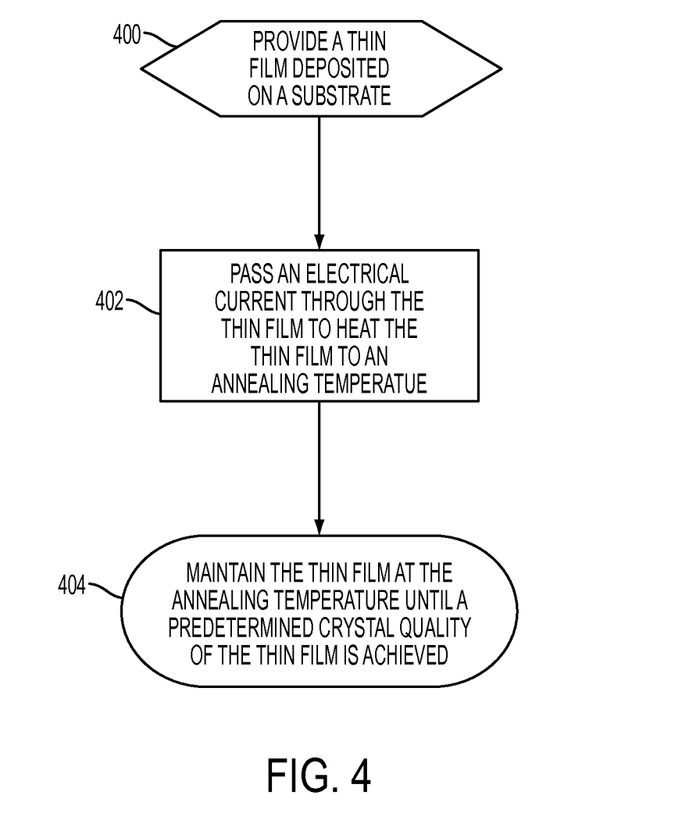
FIG. 4 is flowchart of another example thin film annealing method according to an embodiment.

FIG. 4 illustrates another example method of annealing a thin film deposited on a substrate. As in the example method of FIG. 3, this method begins with providing the thin film, which has been deposited on the substrate, step 400. In this example method, the thin film has an electrical conductivity that is greater than the electrical conductivity of the substrate.

An electrical current is passed through the thin film to heat the thin film to an annealing temperature through joule heating, step 402. As in various embodiments of the example method of FIG. 3, energy is applied to selectively heat the thin film without significantly directly heating the substrate in this example method. Thus, the substrate is only significantly heated via thermal conduction from the thin film and may remain at a significantly lower temperature than the thin film during the annealing process. The temperature difference between the substrate and the thin film may be further increased by thermally coupling the substrate to a heat sink.

The thin film is maintained at the annealing temperature, or higher, until a predetermined crystal quality of the thin film is achieved, step 404, and the annealing process is complete. As in the example method of FIG. 3, the predetermined crystal quality of the thin film may be achieved by maintaining the thin film at the annealing temperature, or higher, for a predetermined time period. Alternatively, as the crystal structure of the thin film changes, so may the conductivity of the thin film. Thus, the predetermined crystal quality of the thin film may be achieved by maintaining the thin film at the annealing temperature, or higher, until the conductivity of the thin film substantially equals a predetermined conductivity.

Figure 5:
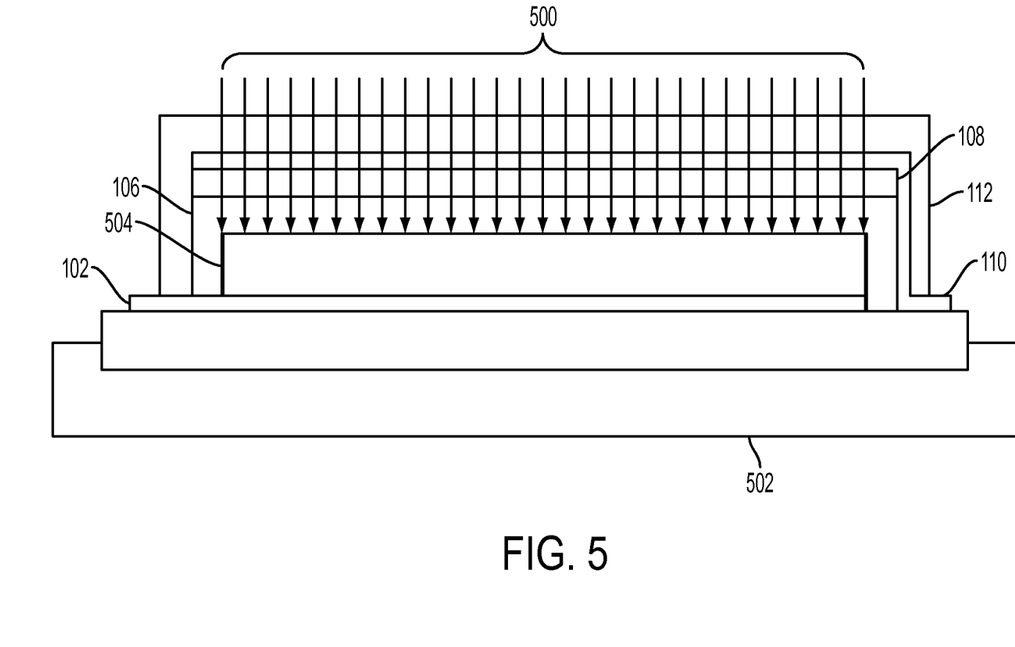
FIG. 5 is a side plan drawing of an example thin film battery undergoing electromagnetic radiation according to an embodiment.
Figure 6:
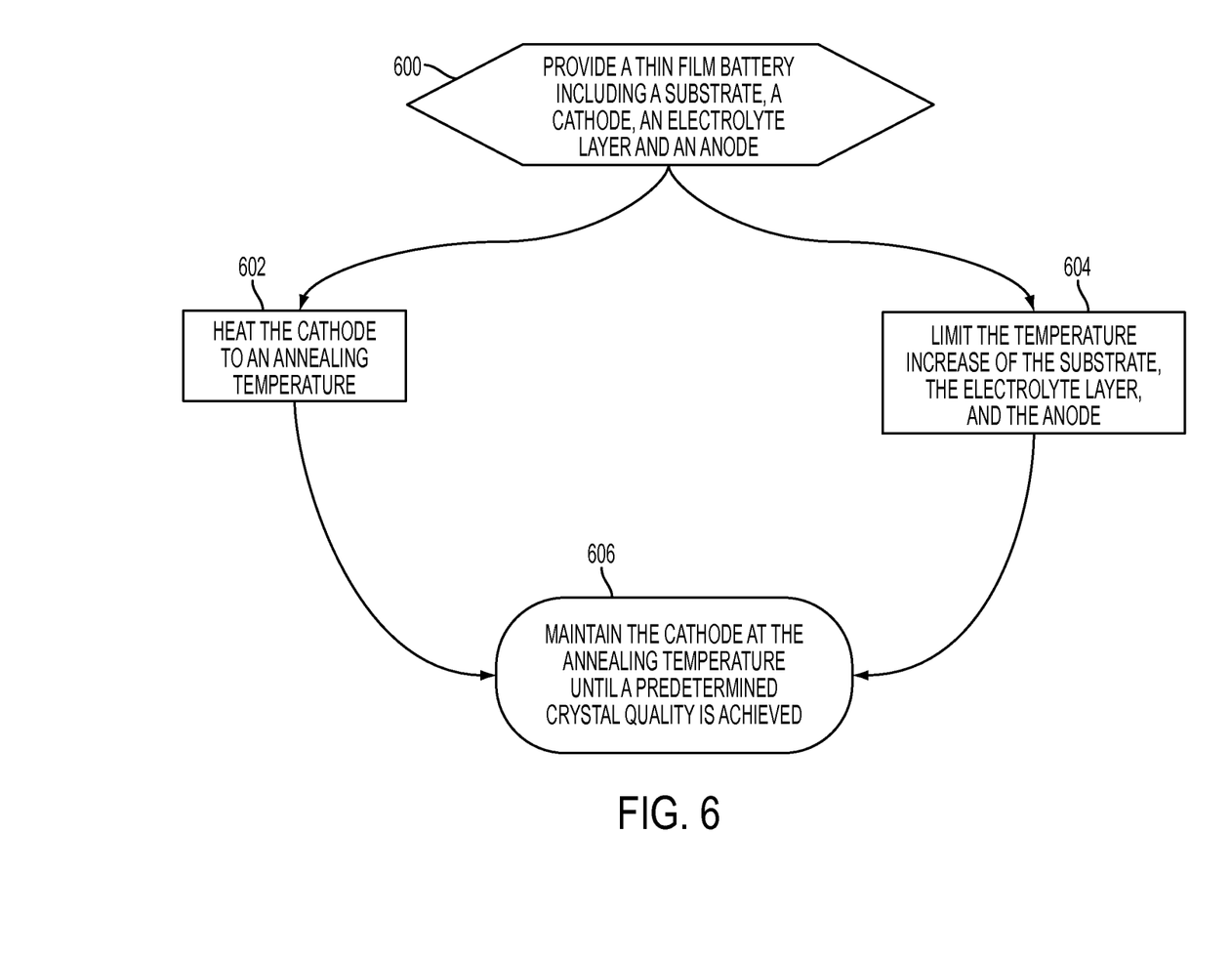
FIG. 6 is flowchart of a further example thin film annealing method according to an embodiment.

FIG. 6 illustrates example method of annealing the cathode of an assembled thin film battery. FIG. 5 graphically illustrates one embodiment of the example method of FIG. 6. This example method begins with providing the thin film battery, step 600. As illustrated in FIG. 5, the example thin film battery includes: substrate 100; cathode current collector 102; unannealed cathode 504; electrolyte 106; anode 108; anode current collector 110; and encapsulation layer 112. One potential difference in performing the annealing process on the cathode after assembly of the thin film battery rather than following deposition of the thin film is that the assembled battery may be more robust than just the substrate and bare thin film.

The cathode is heated to an annealing temperature, step 602, while limiting a temperature increase of the substrate, the electrolyte layer, and the anode, step 604. The cathode is maintained at the annealing temperature, or higher, until a predetermined crystal quality of the cathode is achieved, step 606, and the annealing process is complete. It is noted that the temperature increase of the substrate, the electrolyte layer, and the anode is to be limited (step 604) throughout the annealing process.

FIG. 5 illustrates an embodiment of the example method of FIG. 6 in which heating the cathode to the annealing temperature may include irradiating the cathode with electromagnetic radiation having a predetermined spectral band, the predetermined spectral band of the electromagnetic radiation selected such that: the cathode is substantially absorptive to the electromagnetic radiation; and the substrate, the electrolyte layer, and the anode are substantially transparent to the electromagnetic radiation. It is noted that this embodiment of the example method of FIG. 6 is similar to the example method of FIG. 3, described above, except that, in this embodiment, the thin film battery has been assembled. Thus, the predetermined spectral band of the electromagnetic radiation is selected to be substantially transmitted through the electrolyte layer and the anode in addition to the substrate.

FIG. 5 also illustrates heatsink 502, which is coupled to substrate 100 to assist in limiting the temperature rise of the substrate, step 604. Although not illustrated, it is noted that a heatsink may be thermally coupled to cathode current collector 102, electrolyte 106, anode 108, anode current collector 110, and/or encapsulation layer 112, as well.

In an alternative embodiment of the example method of FIG. 6, heating the cathode to the annealing temperature may include passing an electrical current through the cathode. It is noted that this embodiment of the example method of FIG. 6 is similar to the example method of FIG. 3, described above, except that, in this embodiment, the thin film battery has been assembled.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

We claim:

1. A method of annealing a thin film deposited on a substrate, the method comprising:
   providing the thin film deposited on the substrate;
   irradiating the thin film with electromagnetic radiation until a predetermined crystal quality of the thin film is achieved, a spectral band of the electromagnetic radiation selected such that the thin film is substantially absorptive to the electromagnetic radiation and the substrate is substantially transparent to the electromagnetic radiation;
   wherein irradiating the thin film with the electromagnetic radiation until the predetermined crystal quality of the thin film is achieved includes one of:
      using a gyrotron to irradiate the thin film with narrow bandwidth microwave radiation until the predetermined crystal quality of the thin film is achieved; or
      using an light emitting diode to irradiate the thin film with narrow bandwidth radiation until the predetermined crystal quality of the thin film is achieved.

2. The method of claim 1, wherein the thin film deposited on the substrate, includes thin film cathode material deposited on the substrate.

3. The method of claim 2, wherein the thin film cathode material deposited on the substrate includes at least one of:
   amorphous lithium cobalt oxide ($LiCoO_2$); or
   polycrystalline $LiCoO_2$.

4. The method of claim 3, wherein achieving the predetermined crystal quality of the thin film includes transforming the thin film cathode material into a substantially crystalline $LiCoO_2$ layer having a (104) oriented crystal structure.

5. The method of claim 1, wherein the spectral band of the electromagnetic radiation further selected such that the thin film is annealed by absorbing the electromagnetic radiation through a non-thermal process.

6. The method of claim 5, wherein irradiating the thin film with the electromagnetic radiation until the predetermined crystal quality of the thin film is achieved includes irradiating the thin film with the electromagnetic radiation until a predetermined transmission coefficient of the electromagnetic radiation through the thin film is achieved.

7. The method of claim 1, wherein:
   the spectral band of the electromagnetic radiation further selected such that the thin film is heated by absorbing the electromagnetic radiation; and
   irradiating the thin film with the electromagnetic radiation until the predetermined crystal quality of the thin film is achieved:
      increases a film temperature of the thin film to an annealing temperature; and
      limits a substrate temperature of the substrate to less than a substrate damage temperature.

8. The method of claim 1, wherein irradiating the thin film with the electromagnetic radiation until the predetermined crystal quality of the thin film is achieved includes irradiating the thin film with the electromagnetic radiation for a predetermined time period.

9. A method of annealing a cathode of a thin film battery, the method comprising:
   providing the thin film battery, the thin film battery including:
      a substrate;
      the cathode deposited on the substrate;
      an electrolyte layer formed on the cathode; and
      an anode formed on the electrolyte layer;
   heating the cathode to an annealing temperature by using an inductive heater to inductively couple medium frequency to radio-frequency radiation into the thin film until a predetermined crystal quality of the thin film is achieved; and
   limiting a temperature increase of the substrate, the electrolyte layer, and the anode during annealing of the cathode.

10. The method of claim 9, wherein heating the cathode to the annealing temperature includes using the inductive heater to inductively couple the medium frequency to radio-frequency radiation having a predetermined spectral band into the thin film, the predetermined spectral band of the radio-frequency radiation selected such that:
   the cathode is substantially absorptive to the radio-frequency radiation; and
   the substrate, the electrolyte layer, and the anode are substantially transparent to the radio-frequency radiation.

11. The method of claim 9, further comprising:
   maintaining the cathode at the annealing temperature, or higher, until a predetermined crystal quality of the cathode is achieved.

12. The method of claim 9, further comprising:
   thermally coupling at least one of the substrate, the electrolyte layer, or the anode to a heat sink.

13. A method of annealing a thin film deposited on a substrate, the method comprising:

providing the thin film deposited on the substrate;
irradiating the thin film with electromagnetic radiation through the substrate until a predetermined crystal quality of the thin film is achieved using a gyrotron or an light emitting diode, a spectral band of the electromagnetic radiation selected such that the thin film is substantially absorptive to the electromagnetic radiation and the substrate is substantially transparent to the electromagnetic radiation.

14. The method of claim 13, wherein the thin film deposited on the substrate includes thin film cathode material deposited on the substrate having at least one of amorphous lithium cobalt oxide ($LiCoO_2$) of polycrystalline $LiCoO_2$.

15. The method of claim 14, wherein achieving the predetermined crystal quality of the thin film includes transforming the thin film cathode material into a substantially crystalline $LiCoO_2$ layer having a (104) oriented crystal structure.

16. The method of claim 13, wherein irradiating the thin film with the electromagnetic radiation until the predetermined crystal quality of the thin film is achieved using the gyrotron or the light emitting diode includes one of:
using the gyrotron to irradiate the thin film with narrow bandwidth microwave radiation; or
using the LED to irradiate the thin film with narrow bandwidth radiation.

17. The method of claim 13, wherein the spectral band of the electromagnetic radiation further selected such that the thin film is annealed by absorbing the electromagnetic radiation through a non-thermal process.

18. The method of claim 17, wherein irradiating the thin film with the electromagnetic radiation until the predetermined crystal quality of the thin film is achieved using the gyrotron or the light emitting diode includes irradiating the thin film with the electromagnetic radiation until a predetermined transmission coefficient of the electromagnetic radiation through the thin film is achieved.

19. The method of claim 13, wherein:
the spectral band of the electromagnetic radiation further selected such that the thin film is heated by absorbing the electromagnetic radiation; and
irradiating the thin film with the electromagnetic radiation until the predetermined crystal quality of the thin film is achieved using the gyrotron or the light emitting diode:
increases a film temperature of the thin film to an annealing temperature; and
limits a substrate temperature of the substrate to less than a substrate damage temperature.

20. The method of claim 13, wherein irradiating the thin film with the electromagnetic radiation until the predetermined crystal quality of the thin film is achieved using the gyrotron or the light emitting diode includes irradiating the thin film with the electromagnetic radiation for a predetermined time period.

21. The method of claim 13, wherein irradiating the thin film is performed in a reflective chamber.

* * * * *